United States Patent
Vos

(10) Patent No.: US 11,743,022 B2
(45) Date of Patent: Aug. 29, 2023

(54) METHOD AND APPARATUS FOR RESOURCE ALLOCATION FOR HALF DUPLEX FREQUENCY DIVISION DUPLEXING IN A WIRELESS COMMUNICATION SYSTEM

(71) Applicant: SIERRA WIRELESS, INC., Richmond (CA)

(72) Inventor: Gustav Gerald Vos, Surrey (CA)

(73) Assignee: SEMTECH CORPORATION, Camarillo, CA (US)

( * ) Notice: Subject to any disclaimer, the term of this patent is extended or adjusted under 35 U.S.C. 154(b) by 377 days.

(21) Appl. No.: 17/066,002

(22) Filed: Oct. 8, 2020

(65) Prior Publication Data

US 2021/0028918 A1 Jan. 28, 2021

Related U.S. Application Data

(63) Continuation of application No. 15/155,206, filed on May 16, 2016, now Pat. No. 10,819,496.

(Continued)

(51) Int. Cl.
*H04L 5/16* (2006.01)
*H04L 1/1607* (2023.01)
(Continued)

(52) U.S. Cl.
CPC .............. *H04L 5/16* (2013.01); *H04L 1/1635* (2013.01); *H04L 1/1854* (2013.01);
(Continued)

(58) Field of Classification Search
CPC ....... H04L 5/16; H04L 1/1635; H04L 1/1854; H04L 1/1861; H04L 5/0041; H04W 72/1289
See application file for complete search history.

(56) References Cited

U.S. PATENT DOCUMENTS

2009/0323617 A1   12/2009   Che et al.
2010/0091726 A1   4/2010   Ishii et al.
(Continued)

FOREIGN PATENT DOCUMENTS

CN   104285468 A   1/2015
CN   104335654 A   2/2015
(Continued)

OTHER PUBLICATIONS

Office Action (Communication pursuant to Article 94(3) EPC) dated Jan. 16, 2020, by the European Patent Office in corresponding European Patent Application No. 16 791 876.2-1205. (6 pages).

(Continued)

*Primary Examiner* — Samina F Choudhry
(74) *Attorney, Agent, or Firm* — BUCHANAN INGERSOLL & ROONEY PC

(57) ABSTRACT

A method and apparatus for resource allocation for half duplex frequency division duplexing in a wireless communication system is provided. Fixed or variable HARQ timing of greater than 5 subframes may be implemented. Acknowledgements for multiple downlink (uplink) transmissions can be bundled into a single acknowledgement transmitted on an uplink (downlink) control channel. Bundled acknowledgements for downlink transmissions may also be provided. Variable lead time cross subframe scheduling may be provided in which the number of subframes of delay between an uplink or downlink grant and the corresponding scheduled uplink or downlink transmission changes based on other scheduled events and/or half-duplex transceiver availability in the appropriate mode. The scheduling may select the earliest available subframe after a minimum delay. Uplink grant bundling may also be performed, in which multiple uplink grants are transmitted via a single grant indication.

31 Claims, 10 Drawing Sheets

Related U.S. Application Data

(60) Provisional application No. 62/161,624, filed on May 14, 2015.

(51) Int. Cl.
*H04L 1/1829* (2023.01)
*H04L 5/00* (2006.01)
*H04W 72/23* (2023.01)

(52) U.S. Cl.
CPC .......... *H04L 1/1861* (2013.01); *H04L 5/0041* (2013.01); *H04W 72/23* (2023.01)

(56) References Cited

U.S. PATENT DOCUMENTS

| | | | |
|---|---|---|---|
| 2010/0169732 | A1 | 7/2010 | Wu |
| 2012/0106408 | A1 | 5/2012 | Papasakellariou et al. |
| 2013/0083753 | A1* | 4/2013 | Lee .................. H04L 1/1858 370/329 |
| 2013/0182627 | A1 | 7/2013 | Lee et al. |
| 2013/0208692 | A1 | 8/2013 | Seo et al. |
| 2013/0242824 | A1 | 9/2013 | Lee et al. |
| 2013/0250772 | A1 | 9/2013 | Yin |
| 2013/0308550 | A1 | 11/2013 | Yin et al. |
| 2013/0322413 | A1 | 12/2013 | Pelletier et al. |
| 2014/0056237 | A1 | 2/2014 | Eriksson et al. |
| 2014/0293883 | A1 | 10/2014 | Wang et al. |
| 2015/0103749 | A1 | 4/2015 | Kela et al. |
| 2016/0164643 | A1 | 6/2016 | Loehr et al. |
| 2016/0165592 | A1 | 6/2016 | Han et al. |
| 2016/0183308 | A1* | 6/2016 | Eriksson ............. H04W 72/121 370/329 |

FOREIGN PATENT DOCUMENTS

| | | |
|---|---|---|
| EP | 2200208 A1 | 6/2010 |
| WO | 2009105750 A1 | 8/2009 |
| WO | 2009137646 A2 | 11/2009 |
| WO | 2014202353 A1 | 12/2014 |
| WO | 2016179711 A1 | 11/2016 |

OTHER PUBLICATIONS

3GPP TS 36.213: Evolved Universal Terrestrial Radio Access (E-UTRA); Physical layer procedures, Version 12.5.0, Mar. 26, 2015 (239 pages).

PCT Written Opinion and International Search Report dated Jul. 22, 2016, in corresponding International Application No. PCT/CA2016/050554 (13 pages).

Office Action (First Office Action) dated Jul. 27, 2020, by the China National Intellectual Property Administration in corresponding Chinese Patent Application No. 201680039531.9, and an English Translation of the Office Action (18 pages).

Extended European Search Report dated Apr. 8, 2019, issued in EP 16791876.2.

Ericsson, "Physical channel timing relationships for MTC," 3GPP TSG-RAN WG1 Meeting #79: R1-144558, Nov. 2014.

Alcatel-Lucent, "HD-FDD and TDD Aspects of the Solutions for Subframe Bundling," 3GPP TSG-RAN WG2 #62: R2-082467, Apr. 2008.

IPWireless, NextWave Wireless, Mitsubishi Electric, "Operation of Half Duplex", 3GPP Draft, R1-074935, 3rd Generation Partnership Project (3GPP), Mobile Competence Centre, Oct. 30, 2007 (4 pages).

The extended European Search Report dated Mar. 21, 2022, by the European Patent Office in corresponding European Application No. 21216046.9 (12 pages).

* cited by examiner

| Subframe # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| PDCCH | DG1 k=0 UG1 k=4 | DG2 k=0 UG2 k=4 | DG3 k=0 UG3 k=4 | | | | | | DG4 k=0 UG4 k=4 | DG5 k=0 UG5 k=4 | DG6 k=0 UG6 k=4 | | | | | | DG7 k=0 UG7 k=4 | DG8 k=0 UG8 k=4 | DG9 k=0 UG9 k=4 | |
| PDSCH | D1 | D2 | D3 | | | | | | D4 | D5 | D6 | | | | | | D7 | D8 | D9 | |
| Switch | | | | S | | | | S | | | | S | | | | S | | | | S |
| PUCCH | | | | | A1 | A2 | A3 | | | | | | A4 | A5 | A6 | | | | | |
| PUSCH | | | | | U1 | U2 | U3 | | | | | | U4 | U5 | U6 | | | | | |

FIG. 1 (PRIOR ART)

| Subframe # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| M-PDCCH 202 | DG1 k=2 UG1 k=7 | DG2 k=2 UG2 k=7 | DG3 k=2 UG3 k=7 | DG4 k=2 UG4 k=7 | | | | | | | | | DG5 k=2 UG5 k=7 | DG6 k=2 UG6 k=7 | DG7 k=2 UG7 k=7 | DG8 k=2 UG8 k=7 | | | | | | | |
| PDSCH 204 | | D1 | D2 | D3 | D4 | | | | | | | | A1 | A2 | A3 | A4 | D6 | D7 | D8 | | | | |
| Switch | | | | | | | S | | | | | S | | | | | | | S | | | | |
| PUCCH 208 | | | | | | | | A1 | A2 | A3 | A4 | | | | | | | | | A5 | A6 | A7 | A8 |
| PUSCH 210 | | | | | | | | U1 | U2 | U3 | U4 | | | | | | | | | U5 | U6 | U7 | U8 |

310 → D1, 330 → S (subframe 6), 320 → A1/U1

FIG. 3

| Subframe # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| M-PDCCH 202 | DG1 k=2 UG1 k=5 | DG2 k=2 UG2 k=5 | DG3 k=8 UG3 k=5 | DG4 k=8 UG4 k=5 | | | | | | | DG5 k=2 UG5 k=7 A1 | DG6 k=2 UG6 k=7 A2 | DG7 k=8 UG7 k=7 A3 | DG8 k=8 UG8 k=7 A4 | | | | | | |
| PDSCH 204 | | | D1 | D2 | | | | | | | D3 | D4 | D5 | D6 | | | | | | |
| Switch | | | | | S | | | | | S | | | | | S | | | | | S |
| PUCCH 208 | | | | | | U1 | U2 | A1 | A2 | | | | | | | A3 | A4 | A5 | A6 | |
| PUSCH 210 | | | | | | | | U3 | U4 | | | | | | | U5 | U6 | U7 | U8 | |

FIG. 4

| Subframe # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| M-PDCCH 202 | DG1 k=2 | DG2 k=2 | DG3 k=2 | DG4 k=2 | DG5 k=5 | DG6 k=5 | | | | DG7 k=2 | DG8 k=2 | DG9 k=5 | DG10 k=5 | | | | DG11 k=2 | DG12 k=2 | DG13 k=5 | DG14 k=5 | | | |
| PDSCH 204 | | | D1 | D2 | D3 | D4 | | | | D5 | D6 | D7 | D8 | | | | D9 | D10 | D11 | D12 | | | |
| Switch | | | | | | | S | | S | | | | | S | | S | | | | | S | | S |
| PUCCH 208 | | | | | | | | A1-2 | | | | | | | A3-6 | | | | | | | A7-10 | |
| PUSCH 210 | | | | | | | | | | | | | | | | | | | | | | | |

FIG. 6

METHOD AND APPARATUS FOR RESOURCE ALLOCATION FOR HALF DUPLEX FREQUENCY DIVISION DUPLEXING IN A WIRELESS COMMUNICATION SYSTEM

CROSS-REFERENCE TO RELATED APPLICATIONS

The present application is a continuation of U.S. application Ser. No. 15/155,206, filed on May 16, 2016, which claims the benefit and priority of U.S. Provisional Application 62/161,624 filed on May 14, 2015. The foregoing applications are incorporated by reference herein in their entirety.

FIELD OF THE INVENTION

The present technology pertains in general to wireless communications and in particular to resource allocation in a half-duplex frequency division duplex (HD-FDD) operating mode.

BACKGROUND

The Long Term Evolution (LTE) wireless communication standard can offer a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance (such as its data capacity) in order to gain other benefits, such as a reduced complexity and/or cost. The $3^{rd}$ Generation Partnership Project has considered such possibilities, for example in connection with "low-cost" or "limited capability" User Equipment (UE).

For example, 3GPP LTE Release 12 starts to tackle the power consumption issues through the introduction of Power Saving Mode (PSM) which will allow increased deep sleep time in idle modes, and allow manufacturers to make power-saving and latency trade-offs. For example, a device can be OFF, but still retain its context within the wireless network. In addition, Release 12 makes a first step towards cost reduction by reducing the peak uplink (UL) and downlink (DL) rates for low cost, low complexity UEs, also referred to as "Category 0" (CAT-0) UEs. In various cases, data rates are reduced to 1 Mbps, requiring 1 antenna (and corresponding receiver chain), and offering the option of half duplex operation.

As an example implementation, in LTE Release 12 for a CAT-0 device, a fixed DL and UL cross subframe (SF) channel was used. The resulting peak throughput was 375 kbps, wherein 3 of 8 SF are utilized at a peak of 1 Mbps. This configuration of half duplex frequency division duplexing (HD-FDD) is illustrated in FIG. 1. However, an improvement in the speed provided for HD-FDD for low cost, low complexity user equipment (LC UE) is required.

Therefore there is a need for a method and apparatus for improving resource allocation for half duplex frequency division duplexing that is not subject to one or more limitations in the prior art.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a method and apparatus for resource allocation for half duplex frequency division duplexing in a wireless communication system.

In accordance with an embodiment of the present invention, there is provided a method for resource allocation for half duplex frequency division duplexing in a wireless communication system, the method comprising: monitoring, by a wireless terminal, a downlink shared channel for a plurality of scheduled downlink transmissions by a base station; and generating and transmitting, by the wireless terminal, a bundled acknowledgement on an uplink control channel, the bundled acknowledgement being a single message indicative of a plurality of acknowledgements, negative acknowledgements, or both, corresponding to the plurality of scheduled downlink transmissions.

In accordance with another embodiment of the present invention, there is provided a method for resource allocation for half duplex frequency division duplexing in a wireless communication system, the method comprising: monitoring, by a base station, an uplink shared channel for a plurality of scheduled uplink transmissions by a wireless terminal; and generating and transmitting, by the base station, a bundled acknowledgement on a downlink control channel, the bundled acknowledgement being a single message indicative of a plurality of acknowledgements, negative acknowledgements, or both, corresponding to the plurality of scheduled uplink transmissions.

In some embodiments, the bundled acknowledgement is an acknowledgement when all of the plurality of scheduled (downlink or uplink) transmissions are correctly received, and the bundled acknowledgement is a negative acknowledgement when at least one of the plurality of scheduled transmissions is not correctly received. In some embodiments, the bundled acknowledgement at least partially indicates which of the plurality of scheduled transmissions are correctly received, and at least partially indicates which of the plurality of scheduled transmissions are not correctly received.

In some embodiments, the above method further comprises generating, by the base station, an uplink grant message for the wireless terminal, and transmitting the uplink grant message on the downlink control channel concurrently with the bundled acknowledgement. The uplink grant message may be a bundled uplink grant message indicative of a plurality of uplink grants for the wireless terminal.

In some embodiments, the bundled acknowledgement is transmitted at an earliest opportunity and acknowledges one or more transmissions which occurred at least a predetermined number (e.g. four or five) subframes in the past, with oldest unacknowledged transmissions being acknowledged first.

In accordance with another embodiment of the present invention, there is provided a wireless terminal configured to communicate using half duplex frequency division duplexing in a wireless communication system, the wireless terminal comprising: a wireless receiver configured to monitor a downlink shared channel for a plurality of scheduled downlink transmissions by a base station; a controller configured to generate a bundled acknowledgement, the bundled acknowledgement being a single message indicative of a plurality of acknowledgements, negative acknowledgements, or both, corresponding to the plurality of scheduled downlink transmissions; and a wireless transmitter configured to transmit the bundled acknowledgement on an uplink control channel.

In accordance with another embodiment of the present invention, there is provided a base station supporting half duplex frequency division duplexing in a wireless communication system, the base station comprising: a wireless receiver configured to monitor an uplink shared channel for a plurality of scheduled uplink transmissions by a wireless terminal; a controller configured to generate a bundled acknowledgement, the bundled acknowledgement being a single message indicative of a plurality of acknowledgements, negative acknowledgements, or both, corresponding to the plurality of scheduled uplink transmissions; and a wireless transmitter configured to transmit the bundled acknowledgement on a downlink control channel.

In accordance with another embodiment of the present invention, there is provided a method for resource allocation for half duplex frequency division duplexing in a wireless communication system, the method comprising: wirelessly receiving, by a wireless terminal, an uplink grant or a downlink grant on a downlink control channel in a first subframe; determining, by the wireless terminal, a second subframe following the first subframe, in which to transmit an uplink message corresponding to the uplink grant or to monitor for a downlink message corresponding to the downlink grant, wherein the second subframe occurs a variable number of subframes after the first subframe, the variable number determined based on a predetermined rule set and a current schedule of transmission and reception operations of the wireless terminal; and transmitting, by the wireless terminal, the uplink message on an uplink shared channel or monitoring for the downlink message on a downlink shared channel, during the second subframe.

In accordance with another embodiment of the present invention, there is provided a method for resource allocation for half duplex frequency division duplexing in a wireless communication system, the method comprising: wirelessly transmitting, by a base station, an uplink grant or a downlink grant on a downlink control channel in a first subframe; determining, by the base station, a second subframe following the first subframe, in which to monitor for an uplink message corresponding to the uplink grant or to transmit a downlink message corresponding to the downlink grant, wherein the second subframe occurs a variable number of subframes after the first subframe, the variable number determined based on a predetermined rule set and a copy of a current schedule of transmission and reception operations of the wireless terminal, the copy of the current schedule being maintained by the base station; and, by the base station, monitoring for the uplink message on an uplink shared channel or transmitting the downlink message on a downlink shared channel, during the second subframe.

In accordance with another embodiment of the present invention, there is provided a wireless terminal configured to communicate using half duplex frequency division duplexing in a wireless communication system, the wireless terminal comprising: a wireless receiver configured to receive an uplink grant or a downlink grant on a downlink control channel in a first subframe; a scheduler configured to determine a second subframe following the first subframe, in which to transmit an uplink message corresponding to the uplink grant or to monitor for a downlink message corresponding to the downlink grant, wherein the second subframe occurs a variable number of subframes after the first subframe, the variable number determined by the scheduler based on a predetermined rule set and a current schedule of transmission and reception operations of the wireless terminal; and a wireless transmitter configured to transmit the uplink message on an uplink shared channel or the wireless receiver further configured to monitor for the downlink message on a downlink shared channel, during the second subframe.

In accordance with another embodiment of the present invention, there is provided a base station supporting half duplex frequency division duplexing in a wireless communication system, the base station comprising: a wireless transmitter configured to transmit an uplink grant or a downlink grant on a downlink control channel in a first subframe; a scheduler configured to determine a second subframe following the first subframe, in which to monitor for an uplink message corresponding to the uplink grant or to transmit a downlink message corresponding to the downlink grant, wherein the second subframe occurs a variable number of subframes after the first subframe, the variable number determined by the scheduler based on a predetermined rule set and a copy of a current schedule of transmission and reception operations of the wireless terminal, the copy of the current schedule being maintained by the scheduler; and the wireless transmitter further configured to transmit the downlink message on a downlink shared channel or a wireless receiver configured to monitor for the uplink message on an uplink shared channel, during the second subframe.

In accordance with another embodiment of the present invention, there is provided a method for resource allocation for half duplex frequency division duplexing in a wireless communication system, the method comprising: generating, by a base station, a bundled uplink grant representing a plurality of uplink grants for a wireless terminal; and transmitting the bundled uplink grant to the wireless terminal during a single subframe.

In accordance with another embodiment of the present invention, there is provided a base station supporting half duplex frequency division duplexing in a wireless communication system, the base station comprising: a controller configured to generate a bundled uplink grant representing a plurality of uplink grants for a wireless terminal; and a wireless transmitter configured to transmit the bundled uplink grant to the wireless terminal during a single subframe.

In accordance with another embodiment of the present invention, there is provided a wireless terminal configured to communicate using half duplex frequency division duplexing in a wireless communication system, the wireless terminal comprising: a wireless receiver configured to receive a bundled uplink grant representing a plurality of uplink grants for the wireless terminal and transmitted during a single subframe; and a wireless transmitter configured to transmit, in accordance with a schedule, a plurality of uplink transmissions corresponding to the plurality of uplink grants.

BRIEF DESCRIPTION OF THE FIGURES

Further features and advantages of the present invention will become apparent from the following detailed description, taken in combination with the appended drawings, in which:

FIG. 1 illustrates resource allocation for HD-FDD for a CAT-0 UE in accordance with the prior art.

FIG. 3 illustrates resource allocation for HD-FDD for a CAT-M UE wherein HARQ timing is 5 SF, in accordance with embodiments of the present invention.

FIG. 4 illustrates resource allocation for HD-FDD for a CAT-M UE wherein cross SF scheduling k is variable, in accordance with embodiments of the present invention.

FIG. 6 illustrates resource allocation for HD-FDD for a CAT-M UE wherein PUCCH ACK bundling is supported, in accordance with embodiments of the present invention.

It will be noted that throughout the appended drawings, like features are identified by like reference numerals.

DETAILED DESCRIPTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Various technical terms specified herein may be understood with reference to standards documents pertaining to the Long Term Evolution (LTE) wireless communication, or similar wireless communication standards such as UMTS. While these terms should be read in a manner that is consistent with at least the LTE standard, it is understood that the technology as described herein may be adapted for use with certain other existing or future wireless communication standards or protocols.

Design objectives for a new category (Category M or CAT M) of User Equipment (UE) include objectives for lower cost, lower power consumption and coverage enhancement (CE). Such a category may be used for M2M or MTC devices, for example. In order to meet these objectives, some performance limitations on data transfer quantity and bandwidth can be required. Although the term "UE" is used herein for clarity, it is understood that a UE is a type of wireless terminal, and that other types of wireless terminals may also be used.

Figure 2:
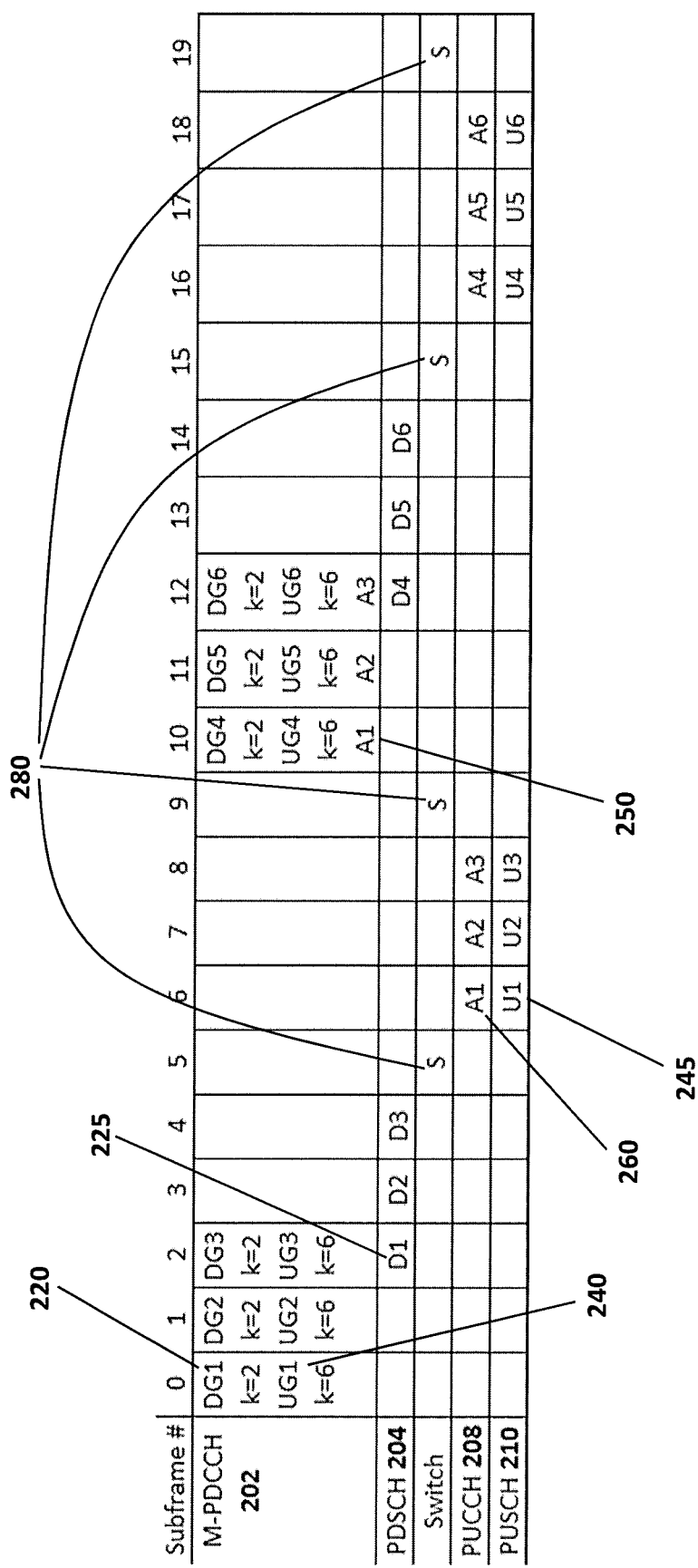
FIG. 2 illustrates resource allocation for HD-FDD for a CAT-M UE.

For a CAT M user equipment (UE), cross subframe (SF) scheduling can be used. For example, downlink control information (DCI) can direct the UE to a different frequency location and the CAT M UE will require one SF in order to re-tune and decode the DCI. In addition, a CAT M UE that only has one RF oscillator, as a cost reduction, will be incapable of transmitting and receiving simultaneously and will need one SF to change from transmission to reception mode and vice-versa. The change in mode may include adjusting the RF oscillator frequency in accordance with the frequency division duplex regime. Furthermore, in coverage enhancement, the DCI can utilize 6 physical resource blocks (PRBs) so the physical downlink shared channel (PDSCH) can be in the following SF. For example, if a fixed downlink (DL) cross SF where k=2 is used, the peak speed will be approximately 300 kbps and 3 of 8 SF are used. This configuration of half duplex frequency division duplexing (HD-FDD) is illustrated in FIG. 2. It is noted that the physical downlink control channel (PDCCH) is configured differently for a CAT M UE and as such has been designated as M-PDCCH that is transmitted in the PDSCH part of the subframe in FIG. 2.

In more detail with respect to FIG. 2, a downlink grant 220 is transmitted via the M-PDCCH 202. Two (k=2) subframes after the downlink grant, a corresponding downlink transmission 225 is received on the PDSCH 204. The UE accordingly configures itself for reception during the downlink transmission. This process is repeated for multiple downlink transmissions. Furthermore, an uplink grant 240 is transmitted via the M-PDCCH 202. Six (k=6) subframes after the subframe which carries the uplink grant, a corresponding uplink transmission 245 is made on the PUSCH 210. The UE accordingly configures itself for transmission operations during the uplink transmission. This process is repeated for multiple uplink transmissions. The UE also transmits an acknowledgement 260 related to reception of the downlink transmission 225. Acknowledgements of downlink transmissions are transmitted on the PUCCH 208. As illustrated, each downlink transmission is acknowledged separately, four SFs after its scheduled transmission. This process is also repeated for multiple downlink transmissions. As also illustrated, an acknowledgement 250 of the uplink transmission 245 is received on the M-PDCCH in the fourth SF after the SF containing the uplink transmission.

The UE switches 280 between transmission and reception modes as required, taking one SF to do so. A sequence of reception and transmission operations is performed. In each reception operation, downlink and/or uplink grants are received, and scheduled downlink transmissions are received by the UE. In each transmission operation, scheduled uplink transmissions are made, and acknowledgements are transmitted, by the UE.

In FIG. 2 as well as similar figures, where n is replaced by a numeric value, "DGn" represents a downlink grant, "Dn" represents the corresponding downlink transmission, and "An" (when appearing in the PUCCH) represents the acknowledgement of the corresponding downlink transmission. Where m is also replaced by a numeric value, "UGm" represents an uplink grant, "Um" represents the corresponding uplink transmission, and "Am" (when appearing in the M-PDCCH) represents the acknowledgement of the corresponding uplink transmission.

According to embodiments of the present invention, resource allocation for half duplex frequency division duplexing (HD-FDD) in a wireless communication system can be adjusted by increasing hybrid automatic repeat request (HARQ) timing. In some embodiments, HARQ timing is configured so that an acknowledgement of a downlink transmission is transmitted by the UE in the fifth subframe after the subframe in which the downlink transmission was made. Other embodiments may use different HARQ timings, for example different fixed timings or variable HARQ timings. HARQ timing may be delayed for example due to temporary unavailability of the half-duplex transmitter during mode switching and reception operations.

According to embodiments of the present invention, resource allocation for half duplex frequency division duplexing in a wireless communication system can be adjusted by using variable downlink (DL) cross subframe (SF) scheduling, for example by using a variable value of k, where k represents the number of subframes into the future that the downlink communication corresponding to the current downlink grant is scheduled to be performed. In various embodiments, k is deterministic and is determined by the CAT M UE based on other information already at hand. As such, the value of k need not be explicitly transmitted to the UE, for example by the evolved Node B (eNB) or similar infrastructure entity.

The UE may determine the scheduling lead timing parameter k based on a determination of which subframe is the next available subframe in which a downlink transmission can be accommodated. Subframes are considered unavailable if they are required for switching between transmission and reception modes, if they are required for transmission purposes by the UE, or if they are already scheduled for receiving a different downlink transmission.

In some embodiments, the next available subframe may be determined based on information received in subframes up to and including the subframe carrying the downlink grant for which k is to be determined.

According to embodiments of the present invention, resource allocation for half duplex frequency division duplexing in a wireless communication system can be adjusted by the bundling of acknowledgements (ACKs) transmitted in the uplink direction. Acknowledgements may be carried in the uplink direction via the physical uplink control channel (PUCCH). In some embodiments, the use of ACK bundling can be performed with variable HARQ timing.

According to embodiments of the present invention, resource allocation for half duplex frequency division duplexing in a wireless communication system can be adjusted by the bundling of uplink grants (UL grant bundling) and the bundling of acknowledgements transmitted in the downlink direction. The acknowledgements may be carried via the M-PDCCH.

According to some embodiments, one or more of the above-noted adjustments to resource allocation for half duplex frequency division duplexing in a wireless communication system is expected to potentially increase the peak speed of the connection to up to about 727 kbps for a CAT M UE.

Increase HARQ Timing

According to embodiments of the present invention, resource allocation for half duplex frequency division duplexing in a wireless communication system can be improved by increasing hybrid automatic repeat request (HARQ) timing. For example, the HARQ timing, namely the time difference (counted in subframes) between the subframe containing a transmission and the subframe containing an acknowledgement of that transmission, can be set to 5 subframes. The acknowledgement may potentially be a negative acknowledgement in some embodiments. As is known, in systems compliant with current LTE standards, HARQ timing is set to 4 subframes. As such, an additional delay in transmitting acknowledgements is introduced.

An example of resource allocation for half duplex frequency division duplexing in a wireless communication system, wherein the HARQ timing is set at 5 SF is illustrated in FIG. 3. In this example, it can be seen that increasing the UL and the DL HARQ timing to 5 SF can potentially increase the data rate to 333 kbps (due to 4 of 12 SFs being used for UL/DL transmission), which is an increase when compared to FIG. 2 wherein the data rate can be 300 kbps (due to 3 of 10 SFs being used for UL/DL transmission).

In more detail, FIG. 3 illustrates a downlink transmission 310 via the PDSCH 204, followed, five subframes later, by an acknowledgement 320 of the downlink transmission 310 via the PUCCH. Other downlink transmissions and uplink transmissions are also acknowledged five subframes after their respective transmissions.

This configuration leads to other changes in the communication sequence in FIG. 3, relative to FIG. 2. For example, because the acknowledgement 320 occurs in SF #7 rather than SF #6, the UE can delay switching 330 from reception to transmission mode until SF #6. This results in the UE being in reception mode in SF #5 so that a downlink transmission D4 can be received in SF #5 (and also scheduled and acknowledged). The acknowledgement of D4 in SF #10 creates an opportunity to also perform an uplink transmission U4 in SF #10.

According to embodiments, when the HARQ timing is set to 5 SF, transmission time interval (TTI) bundling can be used with 4 TTIs per bundle. Accordingly, the transport block size index $I_{TBS}$ is set to 6 (as can be determined for example from Table 7.1.7.2.1-1 of the 3GPP specification document entitled "3GPP TS 36.213: Evolved Universal Terrestrial Radio Access (E-UTRA); Physical layer procedures," Version 12.5.0, Mar. 26, 2015). It is observed that such a value is often used for improvement of UL coverage for voice communication in a wireless communication system.

Variable Lead Time for Cross SF Scheduling

According to embodiments of the present invention, resource allocation for half duplex frequency division duplexing in a wireless communication system can be improved by using variable downlink (DL) cross subframe (SF) scheduling. In particular, a variable value of the parameter k can be assigned. As mentioned above, the parameter k represents the number of subframes into the future that the downlink communication corresponding to the current downlink grant is scheduled to be performed. A similar parameter can also be defined for scheduling of uplink communications.

The value of the parameter k may be deterministic to the CAT M UE and need not necessarily be explicitly communicated to the UE via wireless signalling, for example from an eNB. As such, the UE may be configured to determine the value of k to be used without receiving an explicit indication of k on the downlink.

According to embodiments, allowing k to be variable, for example to vary between 2 and 8, can increase peak speed to 400 kbps wherein 4 of 10 subframes are used. An example of this configuration of resource allocation is illustrated in FIG. 4.

According to embodiments, and having regard to FIG. 4, the determination of the DL value of k is determined without explicitly signalling of same. In various embodiments, the DL grant value of k is set equal to two for each downlink grant, unless the second subframe after the downlink grant is unavailable. A subframe is marked as unavailable if it coincides with a transmission mode of operation of the UE (also referred to as an UL SF), or if it coincides with a frame in which the UE is switching between transmission mode and reception mode (also referred to as a switching SF). When the second subframe after the downlink grant is unavailable, the DL grant value of k is set to be the smallest value such that the $k^{th}$ subframe after the current subframe is available. A subframe is marked available if it coincides with a reception mode of operation of the UE (also referred to as a DL SF) and no other downlink transmission to the UE is already scheduled to occur in that subframe.

The UE may be configured to determine the value of k, i.e. the next available DL SF, based on current scheduling information. The current scheduling information may include received uplink grants and received downlink grants, as well as information derived therefrom such as subframes set aside for transmitting messages based on the uplink grants and for receiving messages based on the downlink grants, for transmitting and receiving acknowledgments based on the transmitted messages, and for switching between transmission and reception modes.

When the second subframe after the downlink grant is unavailable, it implies that the UE is currently not operating in the reception mode. The UE may then determine when the reception mode is to resume by determining when all acknowledgments for transmission via the physical uplink control channel (PUCCH) will have been transmitted by the UE, and when all scheduled physical uplink shared channel (PUSCH) transport blocks (TB) will have been transmitted by the UE. The reception mode may be expected to resume on the second subframe after the last scheduled transmission on the PUCCH and PUSCH (accounting for a one subframe delay for switching to reception mode). For definiteness, in the embodiment illustrated in FIG. 6, an ACK is set to be transmitted via the PUCCH five SF after the corresponding PDSCH TB is transmitted, and a transport block is set to be transmitted on the PUSCH five SF after the corresponding UL grant.

In more detail, FIG. 4 illustrates an uplink grant 410 communicated on the M-PDCCH 202. Accordingly, the corresponding uplink message 420 is scheduled to be transmitted five subframes after the subframe containing the UL grant 410. Because this is the first transmission (at least recently), the UE reserves the subframe prior to transmission of the uplink message 420 for switching 430 to transmission mode. Next, when the UE receives another downlink grant 440 two subframes prior to the switching operation 430, it determines that the second subframe after the downlink grant 440 is unavailable. Given the current uplink schedule, the next available DL SF 460 is determined to occur k=8 SF after the downlink grant 440. In more detail, the current schedule includes at least the scheduled transmission of two acknowledgements 452, 454 a fixed interval of five subframes after scheduled receipt of their corresponding downlink messages 451, 453 respectively. Even though downlink message 453 has not occurred when downlink grant 440 is received, it is expected to occur due to the presence of DG2 in SF #1. An acknowledgement 465 to the downlink message 460 is also scheduled 5 SF after its scheduled transmission.

Figure 5:
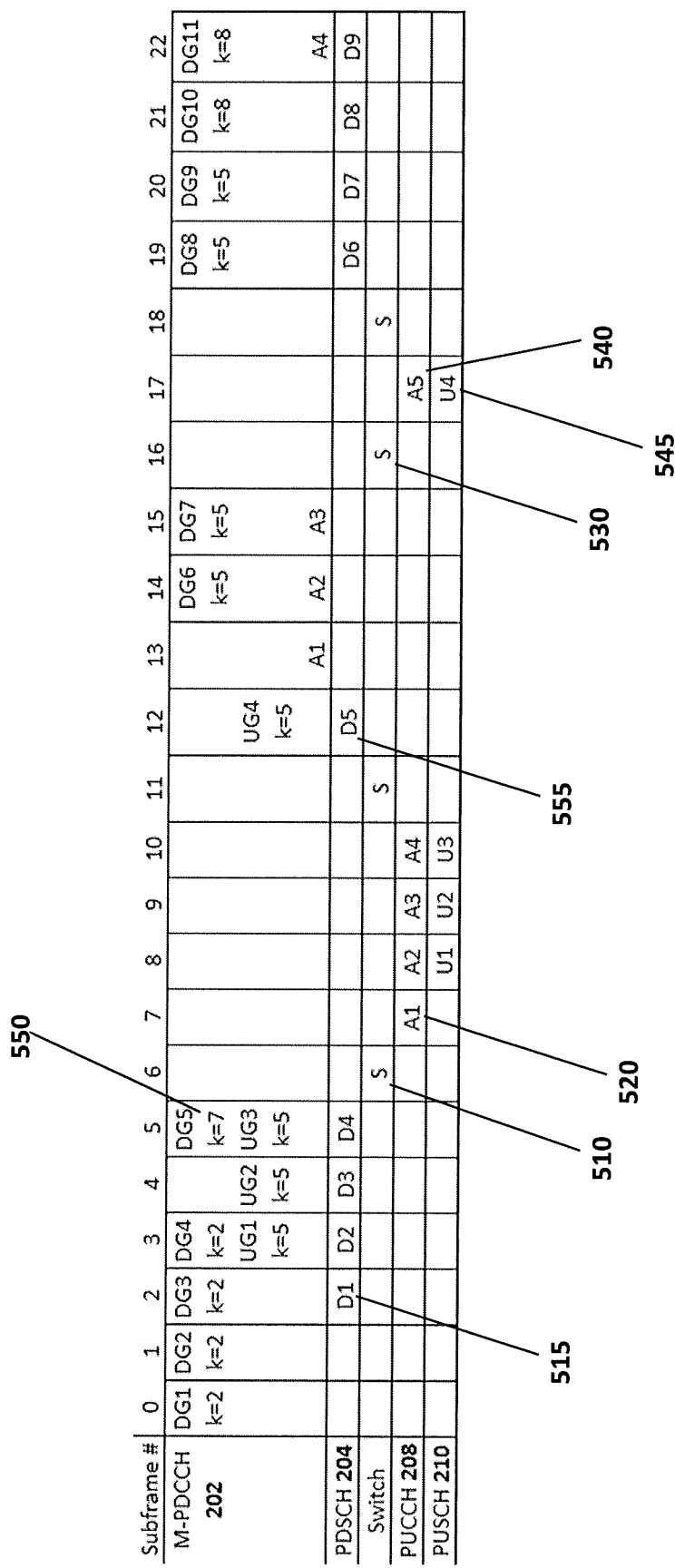
FIG. 5 illustrates resource allocation for HD-FDD for a CAT-M UE wherein cross SF scheduling k is variable, in accordance with embodiments of the present invention.

Another example, wherein k is allowed to vary for cross SF scheduling, is illustrated in FIG. 5. In this example, the timing of the first switch 510 from reception to transmission is determined based on the requirement to send acknowledgement A1 520 via the PUCCH and the timing of the second switch 530 from reception to transmission is determined by the need to send acknowledgement A5 540 and uplink data U4 545 in the same subframe but on a different channel 210. Acknowledgement A1 520 is scheduled 5 SF after receipt of the corresponding downlink message D1 515. Additionally, when downlink grant DG5 550 is received, the unavailability of the second subframe after DG5 results in a determination that the next available subframe for reception 555 of D5 is k=7 subframes away. This determination can be made based on prior scheduling information such as downlink grants, uplink grants, and the corresponding schedule of reception, transmission, acknowledgement and switching operations triggered thereby. The determination may be made by maintaining and consulting a schedule such as that represented by FIG. 5.

PUCCH ACK Bundling

According to embodiments of the present invention, resource allocation for half duplex frequency division duplexing in a wireless communication system can be improved by the use of bundling of acknowledgements (ACK) being transmitted in the uplink direction. For example, ACKs transmitted via the physical uplink control channel (PUCCH) can be bundled, which is referred to as PUCCH ACK bundling. The bundled acknowledgments may be used to acknowledge downlink transmissions and/or to trigger retransmission or other action due to a negative acknowledgement or lack of acknowledgement. In some embodiments, the bundling of ACKs transmitted in the uplink direction is performed with variable HARQ timing.

Acknowledgement bundling refers to the process of acknowledging reception of multiple transmissions in a single subframe. For example, the status (ACK or NACK) of multiple acknowledgements can be merged using a logical AND operation, and the output of the logical operation may be transmitted as a bundled acknowledgement. A retransmission or other action is then triggered for all transmissions corresponding to the multiple acknowledgements if the bundled acknowledgement is other than a positive ACK. Bundling may be limited to a predetermined number of acknowledgements, such as 4 or 8 acknowledgements per bundle. This limits the potential number of retransmissions and corresponding inefficiencies. In some embodiments, a bundled acknowledgement may partially or fully identify which specific transmissions of the bundle are being acknowledged and which specific transmissions are being negatively acknowledged. For example, the bundled acknowledgement may include multiple bits or a modulation symbol encoding multiple bits, each bit representing the status of one of the transmissions to which the bundled acknowledgement pertains.

Variable HARQ timing refers to the variability of the timing delay between reception of a transmission (e.g. a DL transmission) and the acknowledgement of the transmission.

In some embodiments, providing PUCCH ACK bundling in which each bundle is based on up to a predetermined number (e.g. four) acknowledgements, can increase the downlink (DL) peak speed up to about 571 kbps. This peak speed corresponds to the situation in which 4 out of every 7 subframes (SF) is used for downlink communication. An example of the resource allocation according to this embodiment is illustrated in FIG. 6. This embodiment also implements a variable value of the scheduling parameter k (representing, as above, the number of subframes into the future that the downlink communication corresponding to the current downlink grant is scheduled to be performed.)

In more detail, FIG. 6 illustrates groups of four contiguous downlink communications, separated by bundled acknowledgements. A first acknowledgement 620 is scheduled five subframes after a corresponding downlink communications D1 610. The acknowledgement 620 is a bundled acknowledgement for both D1 610 and another downlink communication D2 615 which was scheduled for transmission four subframes prior to acknowledgement 620. The UE is required to switch 625 to transmission mode to transmit the acknowledgement 620 and then switches back to reception mode. Because the UE is in transmission mode, some downlink grants, such as DG5 630, are scheduled with a lead time parameter k of five rather than two. In the case of DG5 630, the corresponding downlink communication D5 635 occurs in the first available subframe which is after the acknowledgement 620 and corresponding mode switching.

Acknowledgements may be scheduled based on various factors, such as decoding time requirements, availability of the half-duplex transceiver in transmission mode, and completion of other scheduled events, such as reception of an expected series of downlink grants and corresponding downlink transmissions and acknowledgements. The decoding requirement may impose that acknowledgements cannot be sent less than four subframes after the subframe including the transmission being acknowledged. In some embodiments, the UE may be configured to expect a predetermined number of downlink grants in a corresponding (typically contiguous) block of subframes of predetermined number. The UE may be configured to remain in reception mode during at least the corresponding block of subframes.

It is noted that, in FIG. 6, each bundled acknowledgement represents a limited number (in this case four) of acknowledgements. Downlink transmissions are acknowledged in order based on their time of (scheduled) transmission. Further, bundled acknowledgements do not include acknowledgements of downlink transmissions which may have occurred in the past three subframes. This exclusion is due to the nonzero processing time required to decode the downlink transmissions and determine whether an acknowledgement is appropriate or not. As such, a bundled acknowledgement represents acknowledgements of up to 4 downlink transmissions which were scheduled to occur at least four subframes prior to the subframe containing the bundled acknowledgement, starting with the earliest transmission.

Aside from the first bundled acknowledgement A1-2 620, which represents a "start-up" phase for example following a period of radio inactivity on the downlink, acknowledgements are scheduled to occur after each block of four downlink transmissions. A steady-state periodic cycle of bundled acknowledgements arises, until interrupted by an event such as an uplink transmission. Each acknowledgement occurs in the fifth subframe after the beginning of the preceding block of downlink transmissions, but, because of a running backlog of acknowledgements, the bundled acknowledgements represent acknowledgements of the first portion of the immediately preceding block of downlink transmissions and acknowledgements of the last portion of the block of downlink transmissions prior to the immediately preceding block of downlink transmissions.

According to some embodiments, the concept of Downlink Control Information (DCI) format 1b (which is already a part of the LTE standard) can be configured or repurposed in order to support 4 PUCCH ACK bundling. For example, PUCCH format 1b applies to time division duplexing (TDD) and requires 4 bits, wherein the UCI information is defined as multi-in multi-out (MIMO) ACK/negative ACK (NACK). The UCI information can also be defined as a 4-bit HARQ ACK/NACK.

Figure 7:
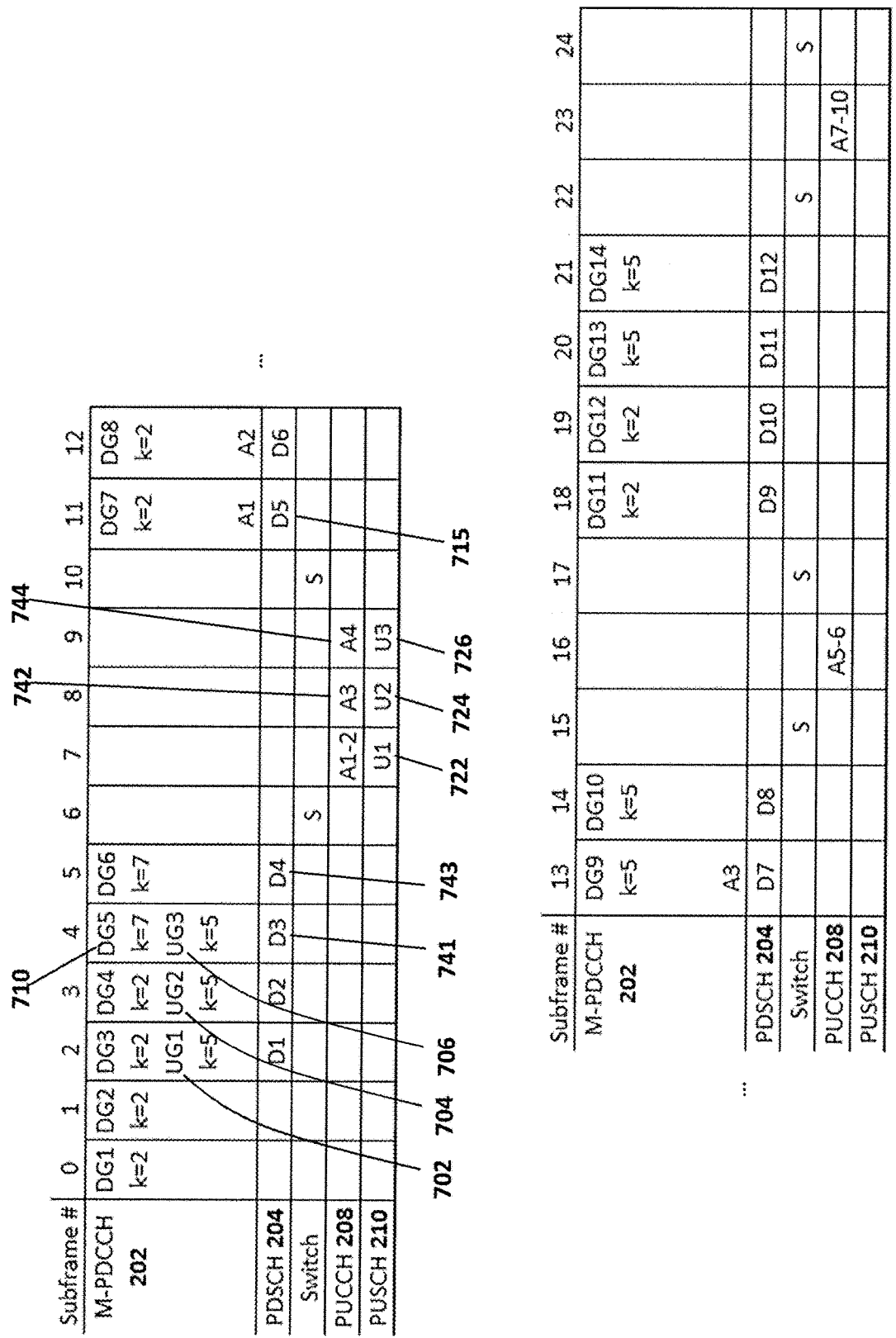
FIG. 7 illustrates resource allocation for HD-FDD for a CAT-M UE wherein PUCCH ACK bundling is supported, in accordance with embodiments of the present invention.

Another example of PUCCH ACK bundling is illustrated in FIG. 7. This example illustrates another example of the UE determining the variable lead time parameter k. In particular, at the time of receipt of downlink grant DG5 710, three uplink grants UG1 702, UG2 704 and UG3 706 have also been received, and three corresponding uplink communications U1 722, U2 724 and U3 726 are scheduled in SF #7 to SF #9. As such, SF #6 to SF #10 are marked as unavailable. The next available subframe after the receipt of DG5 710 in SF #4 is 7 subframes into the future, thus k=7 is set for DG5 and the corresponding downlink transmission D5 715 is scheduled on the PDSCH 204 in SF #11. A similar exercise is performed for scheduling DG6, DG9, DG10, etc.

Also illustrated in FIG. 7 is the occurrence of acknowledgements A3 742 and A4 744. The UE identifies an opportunity to utilize the PUCCH 208 in two subframes (SF #8, SF #9) where it is available. The UE has pending acknowledgements for downlink transmissions D3 741 and D4 743 and therefore acknowledges these downlink transmissions four subframes after their scheduled transmission on the PDSCH. The four subframe delay may be selected in this particular embodiment rather than a different delay, such as a five subframe delay.

Figure 8:
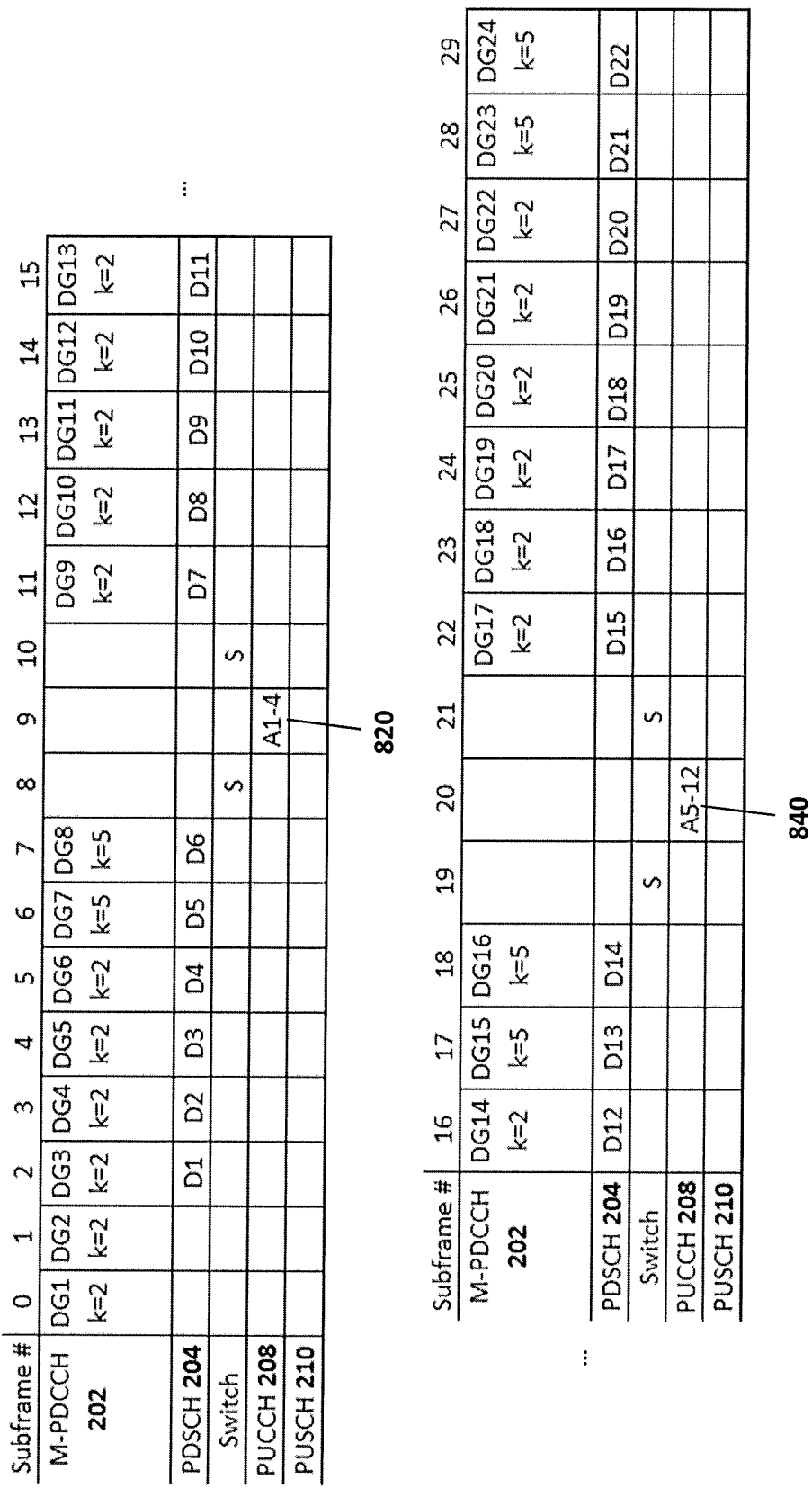
FIG. 8 illustrates resource allocation for HD-FDD for a CAT-M UE wherein PUCCH ACK bundling is supported, in accordance with embodiments of the present invention.

In some embodiments, providing PUCCH ACK bundling of 8 can increase the downlink (DL) peak speed up to about 727 kbps, wherein 8 of 11 subframes (SF) are used. An example of resource allocation according to this embodiment is illustrated in FIG. 8. Each bundled acknowledgement 820, 840 can represent up to eight acknowledgements, with the oldest unacknowledged scheduled downlink transmissions being acknowledged first. In general, acknowledgements are scheduled as soon as possible, and not less than 4 subframes after the subframe in which the transmission occurs, to account for processing delays. In the present case, a longer delay is necessary in many cases, due to the spacing of acknowledgement opportunities. For example, the delay between D5 and A5-12 is 14 subframes.

According to embodiments, DCI format 3, which is already a part of the LTE standard, can be configured or repurposed in order to support 8 PUCCH ACK bundling. For example, PUCCH format 3 applies to frequency division duplexing (FDD) for up to 5 control channels (CC). PUCCH format 3 requires 10 bits, wherein the UCI information is defined as ACK/NACK for up to 5 CC. The UCI information can also be defined as up to a 10-bit HARQ ACK.

UL Grant Bundling and M-PDCCH ACK Bundling

According to embodiments of the present invention, resource allocation for half duplex frequency division duplexing in a wireless communication system can be improved by the use of uplink (UL) Grant bundling and bundling of acknowledgements being transmitted in the downlink direction. For example, acknowledgements transmitted on the M-PDCCH may be bundled, which is referred to as M-PDCCH ACK bundling.

Figure 9:
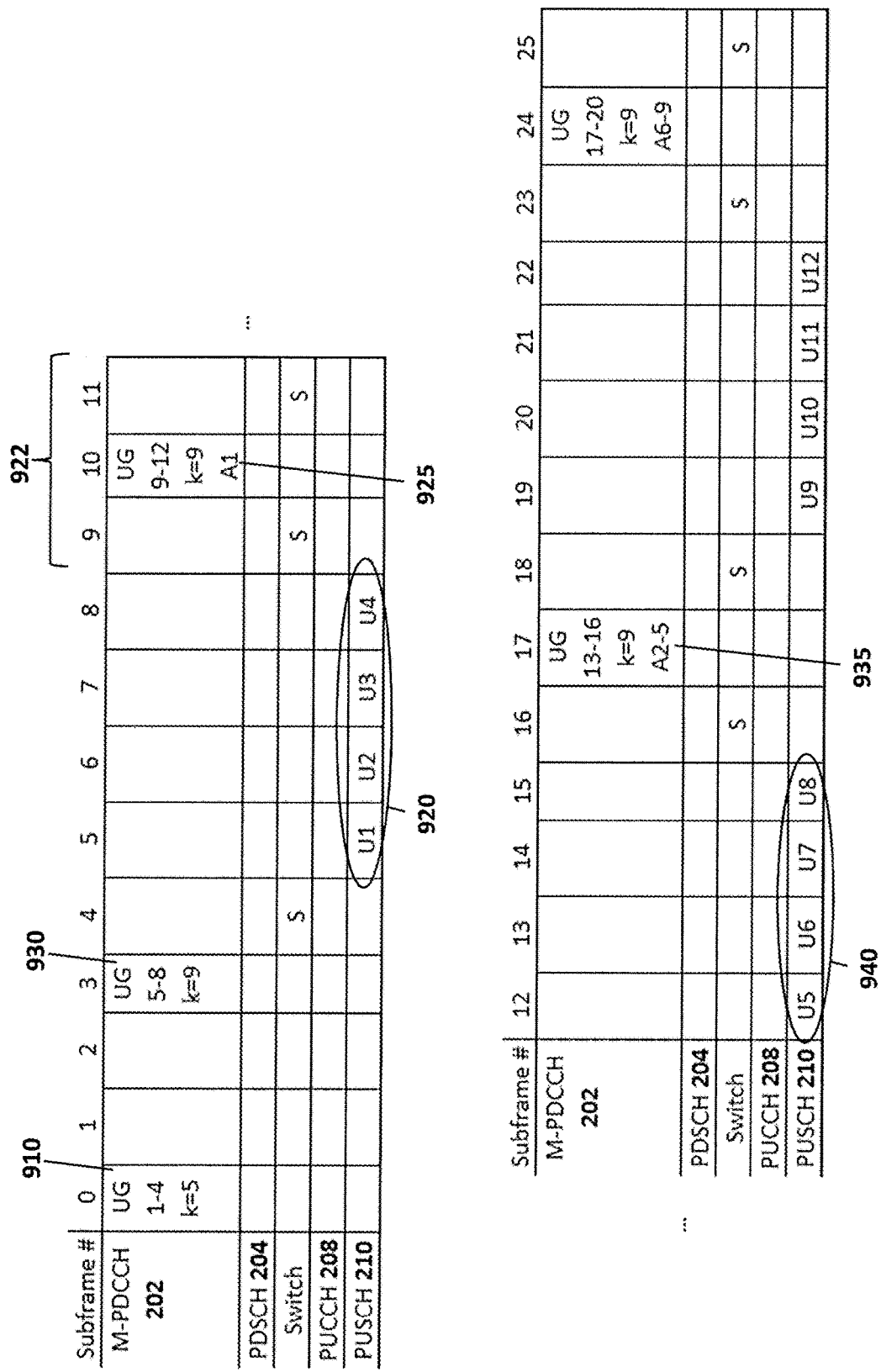
FIG. 9 illustrates resource allocation for HD-FDD for a CAT-M UE wherein UL grant bundling and bundling of ACKs in the downlink direction is supported, in accordance with embodiments of the present invention.

In some embodiments, providing UL Grant bundling and M-PDCCH ACK bundling can increase the uplink (UL) data rate from 400 kbps up to about 571 kbps, wherein 4 of 7 subframes (SF) are used. An example of the resource allocation according to this embodiment is illustrated in FIG. 9. The minimum lead time parameter k for uplink transmission is set to 5. Hence a first bundled uplink grant UG1-4 910 triggers a batch 920 of four contiguous uplink transmissions starting k=5 subframes following the grant 910. A return to reception mode 922 is also scheduled following the batch transmission 920 on the PUSCH. A bundled uplink grant may also be referred to as a batch uplink grant.

A second bundled uplink grant UG5-8 930 triggers another batch 940 of uplink transmissions 940. Because the four (typically contiguous) subframes following the fifth subframe after the grant UG5-8 930 is unavailable (having already been scheduled for use in transmitting U4 and for reception), transmission of the batch 940 is scheduled for the next available set of four subframes, at k=9 subframes after the grant UG5-8 930. As such, the variable lead time parameter k for uplink transmissions operates in the same manner as the lead time parameter k for downlink transmissions. That is, as with downlink transmissions, the lead time parameter k is variable and can be determined based on a current schedule and rule set.

Also illustrated in FIG. 9 are bundled acknowledgements 925, 935 (also referred to as batch acknowledgements) which are transmitted on the M-PDCCH for acknowledging up to four uplink transmissions at a time. The batch acknowledgements are transmitted at the earliest opportunities and acknowledge up to four uplink transmissions which occurred five or more subframes in the past, with the oldest unacknowledged uplink transmissions being acknowledged first. In other embodiments, the batch acknowledgements may acknowledge uplink transmissions which occurred four or more subframes in the past, or another number of subframes greater than four. Furthermore, the batch acknowledgements may acknowledge a different number of uplink transmissions, such as 2, 8 or 16 uplink transmissions.

According to embodiments, a format supporting UL grant bundling can be provided, taking into account the fact that the number of bits needed can be reduced by assuming the same transport block size, and thus the same modulation and coding scheme (MCS), can be used for all grants. For example, UL grant bundling can be configured similar to that which a UE would typically expect when $I_{TBS}=6$ together with at a TTI bundling of 4 is also used.

According to embodiments, the variable k for the (e.g. bundled) UL Grant may no longer be fixed at a value of 5. According to embodiments, k can vary between 5 and 9. As such, the variable k can be specified in the UL Grant or determined by the UE based on the next available UL SF. This manner of determination of the variable k can be envisioned as being similar to how the variable k is determined for the downlink (DL) portion as discussed elsewhere herein.

According to embodiments, the determination of the UL variable k can be determined without signalling. For example, for an UL, k=5 unless that subframe falls on a switching SF or DL SF, then the UL SF to be used will be the next available UL SF.

According to some embodiments, the UE can determine that the next available UL SF based on when all DL (M-PDCCH) ACKs and all scheduled PDSCH TBs have been sent in the DL. For example, a M-PDCCH ACK can be sent 5 subframes after the PUSCH TB is sent. In addition, PDSCH TB can be sent 2 subframes after the DL Grant.

According to embodiments, a HARQ timing of >=5 can be maintained in order that in SF 10 only A1 (ACK 1) can be sent by the evolved NodeB (eNB). In addition, the HARQ timing of >=5 can be maintained in order that in SF 17, ACKs relating to uplink data 2 to 5 can be sent by the eNB.

In various embodiments, the UE is configured to determine the parameters and sequence in use. In various embodiments, the UE is configured to perform failure recovery for example due to a missed grant message, for example as described below.

In some embodiments, when a UE fails to detect a downlink grant in a subframe where one is expected then the UE transmits a negative acknowledgement (NACK). The NACK is transmitted in the same manner and with the same timing as a NACK which would have been sent if the UE had detected the downlink grant, attempted to receive and decode the corresponding downlink message (after 2SF), but did not correctly decode it. This works as expected if the UE has information regarding how many downlink grants are expected in a sequence, so that a determination of when the last downlink grant has been sent can be made.

In various embodiments, a UE may be informed to operate according to a particular embodiment of the present invention via a signal transmitted from the eNB or other base station entity. When there is only one particular embodiment, including one set of corresponding parameter values, being potentially implemented, a single bit in a control message, such as a single Radio Link Control (RLC) bit, may be used to indicate that this particular scheme is in effect by the network and should be utilized by the UE. When there are multiple potential embodiments and/or sets of parameters, the control message may indicate which of the embodiments and/or parameter sets are currently being implemented. The UE may configure itself based on the indication. It is desirable that the UE be aware of the particulars of the current implementation, so that the UE's self-generated schedule of expected events will match the corresponding schedule of the eNB.

In some embodiments, an error condition is addressed in which the UE misses the first downlink grant transmitted in a sequence. According to the error condition, the UE expects a correct number of grants, but, because the first grant is missed, the UE configures its expected timing of scheduled events beginning one SF later than required. It follows that the UE will assume the first downlink grant that it receives (actually the second downlink grant transmitted) is the first of an expected sequence. The UE will also expect a downlink grant in a subframe where one is not sent, at the end of what the UE expects is the sequence of DL grants. It will detect this missing DL grant and transmit a corresponding NACK. More significantly, the UE will send its whole acknowledgement starting one subframe late.

When the acknowledgement is sent using a CDMA mode, the eNB may be capable of and indeed configured to detect the acknowledgement over others expected at that time. If the acknowledgement is a bundled acknowledgement, then the eNB may be configured to detect it and the content with a NACK for the last data SF (as mentioned above). The eNB may then be configured to recover from the fault by re-transmitting the downlink grants and data again. If the acknowledgement is a sequence of individual acknowledgements, the first expected acknowledgement at the eNB will be missing and there will be a NACK at the end. The eNB may be configured to detect this particular pattern and initiate an appropriate recovery operation, for example including retransmitting the downlink grants and data.

In summary, the eNB is configured to detect and recover from an error condition based on a pattern of acknowledgement transmissions by the UE. The error condition indicates that the first downlink grant in a sequence was not correctly received and identified by the UE.

If the UE correctly detects the first downlink grant then subsequent downlink grants that are missed, including the last in the sequence of downlink grants, will be correctly marked by NACKs in the acknowledgements transmitted by the UE.

Figure 10:
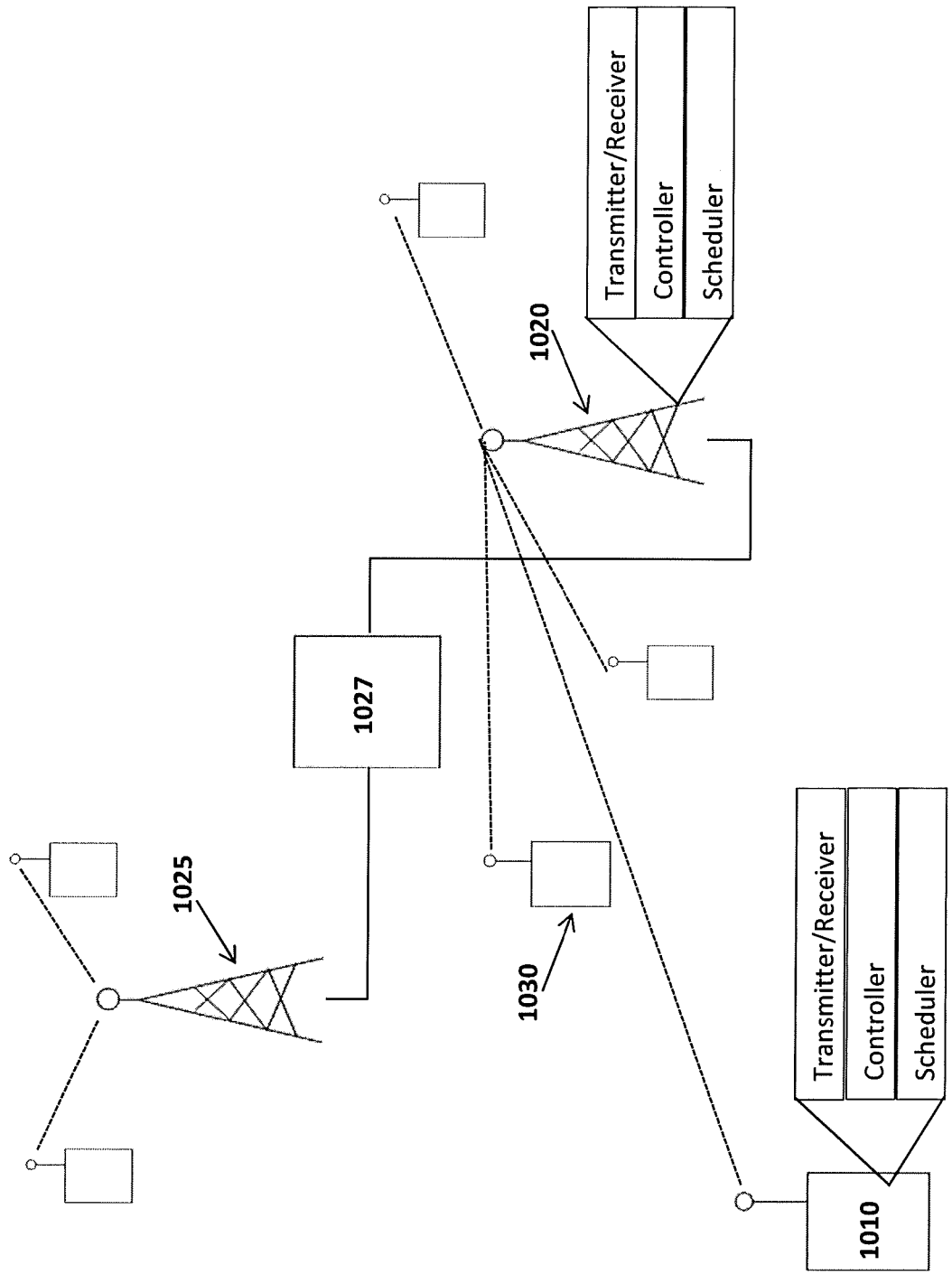
FIG. 10 illustrates a wireless communication system with respect to which embodiments of the present invention interact.

FIG. 10 illustrates a wireless communication system with which a wireless device 1010 is configured to communicate via a network interface thereof. The wireless communication system may operate in accordance with a wireless communication protocol such as LTE, or the like. As illustrated, the wireless communication system comprises a base station 1020, or evolved Node B (eNB) or wireless access point, or the like, communicatively coupled to the wireless device 1010, and typically to a number of other wireless devices such as device 1030. The other wireless devices may be M2M/MTC or CAT M devices or User Equipment (UE). The wireless communication system may further comprise other base stations, eNBs, wireless access points, or the like, such as base station 1025, which may be communicatively coupled with other wireless devices. The base stations may be communicatively coupled with each other and with data networks, telephone networks, other wireless communication systems, and the like, via infrastructure equipment 1027, such as equipment of a network backbone.

In various embodiments, a UE includes a radiofrequency transmitter and/or receiver, such as half-duplex transceiver, baseband communication electronics, and a scheduler. The baseband communication electronics operates with the radiofrequency transmitter and receiver to provide data for wireless transmission and to receive data corresponding to wireless reception. The data is provided to other data sources or sinks within or coupled to the UE.

The scheduler monitors for uplink and downlink grants, and schedules corresponding data transmission and reception operations, as well as acknowledgement transmission and reception operations. The scheduler also schedules switching operations between transmission and reception modes, and marks subframe time slots as unavailable due to such switching operations. The scheduler may also determine the lead time parameter k for various grants, as described herein, when this parameter is not explicitly specified in a grant. The scheduler may be provided using a microprocessor executing program instructions stored in a memory, as well as a working memory for example for storing a current schedule. The scheduler may be provided using other electronic circuitry such as a dedicated processor or microcontroller executing firmware instructions, a field-programmable gate array (FPGA), an application specific integrated circuit (ASIC), or the like, or a combination thereof.

Although various embodiments of the present invention describe operation of a UE, it should be readily appreciated that an eNB, base station, or other infrastructure equipment of a wireless network is also configured to operate in a compatible manner with the UE. In particular, when an uplink or downlink communication, or the transmission or receipt of an acknowledgement is scheduled by a UE, an eNB or other device may correspondingly be configured to schedule this event in the same manner. Notably, in some embodiments, scheduling can be performed independently by the UE and eNB in at least some cases, such that the UE and eNB arrive at and maintain the same schedule based on already-available information.

A base station or eNB, or equivalent collection of infrastructure equipment, includes at least a radiofrequency transmitter and/or receiver, baseband communication electronics, a controller, and a scheduler. The baseband communication electronics operates with the radiofrequency transmitter and receiver to provide data for wireless transmission and to receive data corresponding to wireless reception. The data is provided to other data sources or sinks. The controller generates control messages for transmission, such as grants and acknowledgements. The base station scheduler schedules transmission of uplink and downlink grants, transmission and reception operations, and the like, for multiple UEs, as will be readily understood by a worker skilled in the art. The scheduler performs scheduling operations in accordance with the various rules and configurations as described herein. The base station scheduler and/or controller may be provided using a microprocessor executing program instructions stored in a memory, as well as a working memory for example for storing a current schedule. The base station scheduler and/or controller may be provided at least in part using other electronic circuitry such as one or more microcontrollers executing firmware instructions, FPGAs, ASICs, or the like, or a combination thereof.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, mobile or handheld wireless device, M2M device, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

I claim:

1. A method for resource allocation for half duplex frequency division duplexing in a wireless communication system, the method comprising:
wirelessly receiving, by a wireless terminal, a downlink grant on a downlink control channel in a first subframe;
determining, by the wireless terminal, a second subframe following the first subframe, in which to monitor for a downlink message corresponding to the downlink grant, wherein the second subframe occurs a variable number of subframes after the first subframe and wherein the variable number is determined based on a predetermined rule set and a current schedule of transmission and reception operations of the wireless terminal, wherein the predetermined rule set at least indicates that the variable number is equal to a smallest integer n, of at least a predetermined minimum value, such that an $n^{th}$ subframe contiguously following the first subframe is available for use for monitoring for the downlink message; and
monitoring, by the wireless terminal, for a downlink message on a downlink shared channel during the second subframe.

2. The method of claim 1, further comprising:
determining, by the wireless terminal, the second subframe wherein the variable number is determined based on a predetermined rule set.

3. The method of claim 2, wherein the predetermined rule set is identified in the downlink grant.

4. The method of claim 1, wherein the second subframe depends on whether the second subframe is available for use in monitoring for the downlink message.

5. The method of claim 4, wherein the variable number is explicitly defined in the downlink grant.

6. The method of claim 1, wherein the predetermined minimum value is two.

7. The method of claim 1, wherein the variable number of subframes is explicitly defined in the downlink grant.

8. The method of claim 1, wherein a given subframe is deemed available for use in monitoring for the downlink message when, for the given subframe, a half-duplex transceiver of the wireless device is scheduled to be in a reception mode and no other transmissions to the wireless terminal are scheduled on the downlink shared channel.

9. The method of claim 1, further comprising maintaining the current schedule by the wireless terminal, the current schedule indicative of: scheduled downlink transmissions; scheduled uplink transmissions; scheduled switching operations between transmission and reception modes; scheduled transmissions of uplink acknowledgements; and scheduled reception of downlink acknowledgements.

10. The method of claim 1, further comprising:
determining, by a base station transmitting the downlink grant, the second subframe by independently determining the variable number based on the predetermined rule set and a copy of the current schedule of transmission and reception operations of the wireless terminal; and
transmitting, by the base station, the downlink message on the downlink shared channel during the second subframe.

11. The method of claim 1, wherein the downlink message is a first message of a plurality of M messages for communication in contiguous subframes, and wherein the predetermined rule set indicates that the variable number is equal to a smallest integer n, of at least a predetermined minimum value, such that a contiguous set of M subframes, beginning with an $n^{th}$ subframe contiguously following the first subframe, are available for use monitoring for the downlink message, based on the current schedule.

12. A wireless terminal configured to communicate using half duplex frequency division duplexing in a wireless communication system, the wireless terminal including a processor and a memory storing thereon machine executable instructions, the machine executable instructions, when executed by the processor configure the wireless terminal to:
receive a downlink grant on a downlink control channel in a first subframe;
determine a second subframe following the first subframe, in which to monitor for a downlink message corresponding to the downlink grant, wherein the variable number is determined based on a predetermined rule set and a current schedule of transmission and reception operations of the wireless terminal, wherein the second subframe occurs a variable number of subframes after the first subframe and wherein the predetermined rule set at least indicates that the variable number is equal to a smallest integer n, of at least a predetermined minimum value, such that an $n^{th}$ subframe contiguously following the first subframe is available for use for monitoring for a downlink message; and
monitor for a downlink message on a downlink shared channel during the second subframe.

13. The wireless terminal of claim 12, wherein the machine executable instructions, when executed by the processor, further configure the wireless terminal to determine the second subframe wherein the variable number is determined based on a predetermined rule set.

14. The wireless terminal of claim 13, wherein the predetermined rule set is identified in the downlink grant.

15. The wireless terminal of claim 12, wherein the second subframe depends on whether the second subframe is available for use in monitoring for the downlink message.

16. The wireless terminal of claim 15, wherein the variable number is explicitly defined in the downlink grant.

17. A method for resource allocation for half duplex frequency division duplexing in a wireless communication system, the method comprising:
wirelessly receiving, by a wireless terminal, an uplink grant on a downlink control channel in a first subframe;
determining, by the wireless terminal, a second subframe following the first subframe in which to transmit an uplink message corresponding to the uplink grant, the variable number determined based on a predetermined rule set and a current schedule of transmission and reception operations of the wireless terminal, wherein the second subframe occurs a variable number of subframes after the first subframe and wherein the predetermined rule set at least indicates that the variable number is equal to a smallest integer n, of at least a predetermined minimum value, such that an $n^{th}$ subframe contiguously following the first subframe is available for use in transmitting an uplink message; and
transmitting, by the wireless terminal, an uplink message on an uplink shared channel, during the second subframe.

18. The method of claim 17, further comprising:
determining, by the wireless terminal, the second subframe wherein the variable number is determined based on a predetermined rule set.

19. The method of claim 18, wherein the predetermined rule set is identified in the uplink grant.

20. The method of claim 17, wherein the second subframe depends on whether the second subframe is available for use in transmitting for the uplink message.

21. The method of claim 20, wherein the variable number is explicitly defined in the uplink grant.

22. The method of claim 17, wherein a given subframe is deemed available for use in transmitting the uplink message when, for the given subframe, a half-duplex transceiver of the wireless device is scheduled to be in a transmission mode and no other transmissions by the wireless terminal are scheduled on the uplink shared channel.

23. The method of claim 17, further comprising maintaining the current schedule by the wireless terminal, the current schedule indicative of: scheduled downlink transmissions; scheduled uplink transmissions; scheduled switching operations between transmission and reception modes; scheduled transmissions of uplink acknowledgements; and scheduled reception of downlink acknowledgements.

24. The method of claim 17, further comprising:
determining, by a base station transmitting the uplink grant, the second subframe by independently determining the variable number based on the predetermined rule set and a copy of the current schedule of transmission and reception operations of the wireless terminal; and
receiving, by the base station, the uplink message on the uplink shared channel during the second subframe.

25. The method of claim 17, wherein the uplink message is a first message of a plurality of M messages for communication in contiguous subframes, and wherein the predetermined rule set indicates that the variable number is equal to a smallest integer n, of at least a predetermined minimum value, such that a contiguous set of M subframes, beginning with an $n^{th}$ subframe contiguously following the first subframe, are available for use in transmitting the uplink message based on the current schedule.

26. The method of claim 17, wherein the variable number of subframes is explicitly defined in the uplink grant.

27. A wireless terminal configured to communicate using half duplex frequency division duplexing in a wireless communication system, the wireless terminal including a processor and a memory storing thereon machine executable instructions, the machine executable instructions, when executed by the processor configure the wireless terminal to:
receive an uplink grant on a downlink control channel in a first subframe;
determine a second subframe following the first subframe in which to transmit an uplink message corresponding to the uplink grant, wherein the second subframe occurs a variable number of subframes after the first subframe and the variable number determined based on a predetermined rule set and a current schedule of transmission and reception operations of the wireless terminal, wherein the predetermined rule set at least indicates that the variable number is equal to a smallest integer n, of at least a predetermined minimum value, such that an $n^{th}$ subframe contiguously following the first subframe is available for use in transmitting an uplink message; and
transmit an uplink message on an uplink shared channel during a second subframe, wherein the second subframe occurs a variable number of subframes after the first subframe.

28. The wireless terminal of claim 27, wherein the machine executable instructions, when executed by the processor, further configure the wireless terminal to determine the second subframe wherein the variable number is determined based on a predetermined rule set.

29. The wireless terminal of claim 28, wherein the predetermined rule set is identified in the uplink grant.

30. The wireless terminal of claim 27, wherein the second subframe depends on whether the second subframe is available for use in transmitting for the uplink message.

31. The wireless terminal of claim 30, wherein the variable number is explicitly defined in the uplink grant.

* * * * *